US010712802B2

(12) United States Patent
Chang (10) Patent No.: US 10,712,802 B2
(45) Date of Patent: Jul. 14, 2020

(54) POWER-SAVING WIRELESS SENSING DEVICE AND SYSTEM THEREOF

(71) Applicant: CHAOYANG UNIVERSITY OF TECHNOLOGY, Taichung (TW)

(72) Inventor: Chia-Chi Chang, Taichung (TW)

(73) Assignee: CHAOYANG UNIVERSITY OF TECHNOLOGY, Taichung (TW)

(*) Notice: Subject to any disclaimer, the term of this patent is extended or adjusted under 35 U.S.C. 154(b) by 285 days.

(21) Appl. No.: 15/957,178

(22) Filed: Apr. 19, 2018

(65) Prior Publication Data

US 2018/0307291 A1 Oct. 25, 2018

(30) Foreign Application Priority Data

Apr. 20, 2017 (TW) .............................. 106113304 A (51) Int. Cl.
| | |
|---|---|
| *G06F 1/26* | (2006.01) |
| *G06F 1/32* | (2019.01) |
| *G06F 1/324* | (2019.01) |
| *G06F 9/4401* | (2018.01) |
| *G06F 1/10* | (2006.01) |
| *G06F 1/14* | (2006.01) |
| *G06F 1/3209* | (2019.01) |

(52) U.S. Cl.
CPC ................ *G06F 1/324* (2013.01); *G06F 1/10* (2013.01); *G06F 1/14* (2013.01); *G06F 1/3209* (2013.01); *G06F 9/4418* (2013.01)

(58) Field of Classification Search
CPC ..................................... G06F 1/26; G06F 1/32
See application file for complete search history.

(56) References Cited

U.S. PATENT DOCUMENTS

| 10,149,659 | B1 * | 12/2018 | Schwartz | ................. | H04N 5/32 |
| 2004/0221187 | A1 * | 11/2004 | Durand | ................. | G06F 1/3203 |
| | | | | | 713/300 |
| 2006/0069933 | A1 * | 3/2006 | Matsuoka | ............. | G06F 1/3203 |
| | | | | | 713/300 |
| 2010/0303185 | A1 * | 12/2010 | Haartsen | ........... | H04W 52/0216 |
| | | | | | 375/362 |
| 2013/0261816 | A1 * | 10/2013 | Tang | ........................ | G06F 1/26 |
| | | | | | 700/286 |

* cited by examiner

*Primary Examiner* — Phil K Nguyen
(74) *Attorney, Agent, or Firm* — Muncy, Geissler, Olds & Lowe, P.C.

(57) ABSTRACT

A wireless sensing device includes a wireless transmitter module, a microprocessor unit, and a wake-on unit. The wireless transmitter module is electrically connected to the microprocessor unit and the wake-on unit, respectively. The microprocessor unit is electrically connected to the wake-on unit. When the wireless transmitter module receives a sensing signal from outside and transmits it to the microprocessor unit, the microprocessor unit may enter a hibernation mode or a sleep mode from its previous on-duty mode depending on the level of the sensing signal. When the wireless transmitter module receives a wake-on signal from outside and transmits it to the wake-on unit, the wake-on unit generates a resume-from-hibernation command or a resume-from-sleep command for the microprocessor unit depending on the level of the wake-on signal so as to resume the microprocessor unit.

20 Claims, 6 Drawing Sheets

POWER-SAVING WIRELESS SENSING DEVICE AND SYSTEM THEREOF

BACKGROUND OF THE INVENTION

1. Technical Field

The present invention relates to a wireless sensing device, and more particularly to a power-saving wireless sensing device.

2. Description of Related Art

Figure 1:
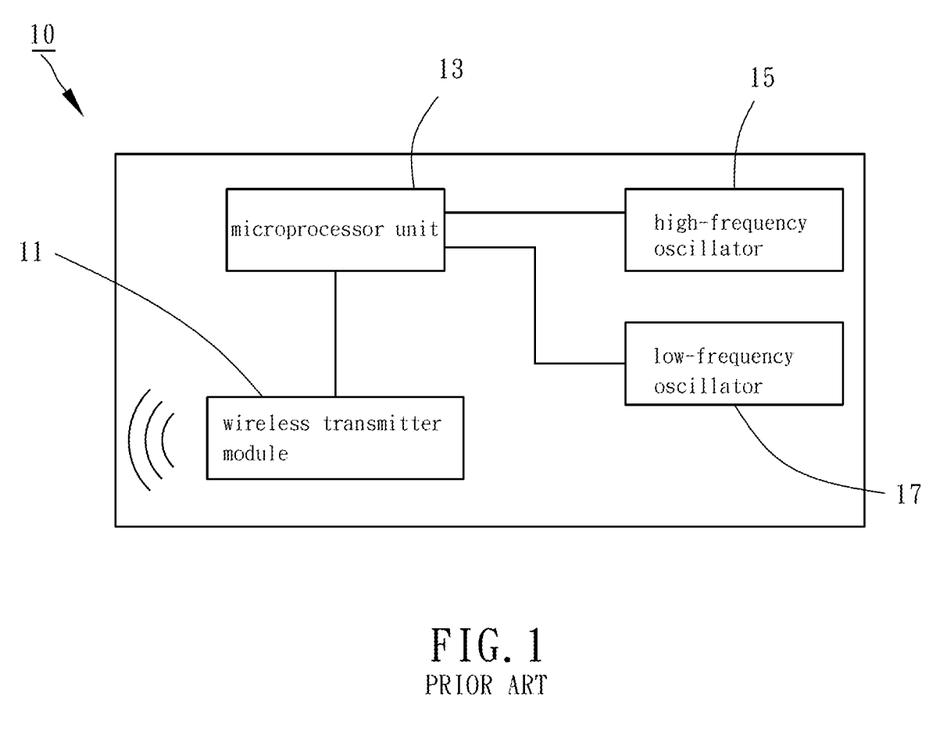
FIG. 1 is a structural diagram of a conventional wireless sensing device.

FIG. 1 shows a conventional wireless sensing device 10 for monitoring a wireless network system. The wireless sensing device 10 comprises a wireless transmitter module 11, a microprocessor unit 13, a high-frequency oscillator 15, and a low-frequency oscillator 17. The microprocessor unit 13 is electrically connected to the wireless transmitter module 11, the high-frequency oscillator 15, and the low-frequency oscillator 17, respectively. The wireless sensing device 10 is powered by a battery and in turn. The high-frequency oscillator 15 provides the microprocessor unit 13 or the wireless transmitter module 11 with the duty clock they need for operation, which is typically of an MHz scale. Under this duty clock frequency, the power consumption ranges from some mA to tens of mA. The low-frequency oscillator 17 provides the microprocessor unit 13 with the basic duty clock it requires for operating its internal timer or conducting its sub-program operation, which is typically of a KHz scale. Under this duty clock frequency, only the internal timer and sub-programs of the microprocessor unit 13 and an external cut-off source are allowed to operate, and the power consumption ranges from some μA to tens of μA.

When the microprocessor unit 13 has stayed idle for a predetermined time period, it enters a hibernation mode or a sleep mode, where it consumes less power. The hibernation mode is triggered by a hibernation command that is generated by the microprocessor unit 13 and transmitted to the high-frequency oscillator 15, so the high-frequency oscillator 15 stops generating the clock in response to the hibernation command. At this time, the low-frequency oscillator 17 is still allowed to operate, and provides the microprocessor unit 13 with the basic duty clock it requires. It also allows the microprocessor unit 13 to automatically wake up after a predetermined time period. On the other hand, the sleep mode is triggered by a sleep command generated by the microprocessor unit 13 and transmitted to the high-frequency oscillator 15 and the low-frequency oscillator 17, respectively, so that the high-frequency oscillator 15 and the low-frequency oscillator 17 both stop generating clock signals in response to the sleep command. At this time, the only way to wake on the microprocessor unit 13 is resting initially or forced turning on from outside.

Hence, it is desired to allow the wireless sensing device 10 to maintain its internal timer and to operate with only tens or hundreds of nA for waking on the microprocessor unit 13 anytime as needed. It is also desired to lower the overall power consumption of the device or the whole system, while maintaining the integrity of the wireless monitoring network system.

BRIEF SUMMARY OF THE INVENTION

In view of this, the objective of the present invention is to provide a wireless sensing device, which supports wireless communication, transmission and remote control through its wireless transmitter module and has an nA-scale power-saving wake-on unit that can work as a wake-on source for its microprocessor unit.

To achieve the foregoing objective, the present invention provides a wireless sensing device, which comprises: a wireless transmitter module, a microprocessor unit, a wake-on unit, a memory unit, a high-frequency oscillator, and a low-frequency oscillator; the wireless transmitter module being electrically connected to the microprocessor unit and the wake-on unit, respectively, the microprocessor unit being electrically connected to the wake-on unit, the memory unit, the high-frequency oscillator, and the low-frequency oscillator; the wake-on unit being a real time clock (RTC) module; the high-frequency oscillator generating a clock that works as a duty clock for the microprocessor unit when the microprocessor unit is in an on-duty mode; the low-frequency oscillator generating a clock that works as a duty clock for the microprocessor unit when the microprocessor unit is in a hibernation mode; the memory unit allowing the microprocessor unit to store a logic program and sub-programs thereof that operate the on-duty mode, the hibernation mode, or a sleep mode therein.

Therein, when the wireless transmitter module receives a sensing signal from outside, and transmits it to the microprocessor unit, the microprocessor unit generates a hibernation command or a sleep command depending on a level of the sensing signal, so that the microprocessor unit enters the hibernation mode from the on-duty mode it is previously in according to the hibernation command, or the microprocessor unit enters the sleep mode from the on-duty mode it is previously in according to the sleep command.

Therein, when the wireless transmitter module receives a wake-on signal from outside, and transmits it to the wake-on unit, the wake-on unit generates a resume-from-hibernation duty clock or a resume-from-sleep duty clock depending on a level of the wake-on signal, and transmits them to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

The present invention also provides a wireless sensing system, which comprises: the foregoing wireless sensing device and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner.

Therein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device.

Therein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

DETAILED DESCRIPTION OF THE INVENTION

The following preferred embodiments when read with the accompanying drawings are made to clearly exhibit the above-mentioned and other technical contents, features and effects of the present invention. Through the exposition by means of the specific embodiments, people would further understand the technical means and effects the present invention adopts to achieve the above-indicated objectives. However, the accompanying drawings are intended for reference and illustration, but not to limit the present invention and are not made to scale. Unless otherwise noted, like elements will be identified by identical numbers throughout all figures.

Figure 2:
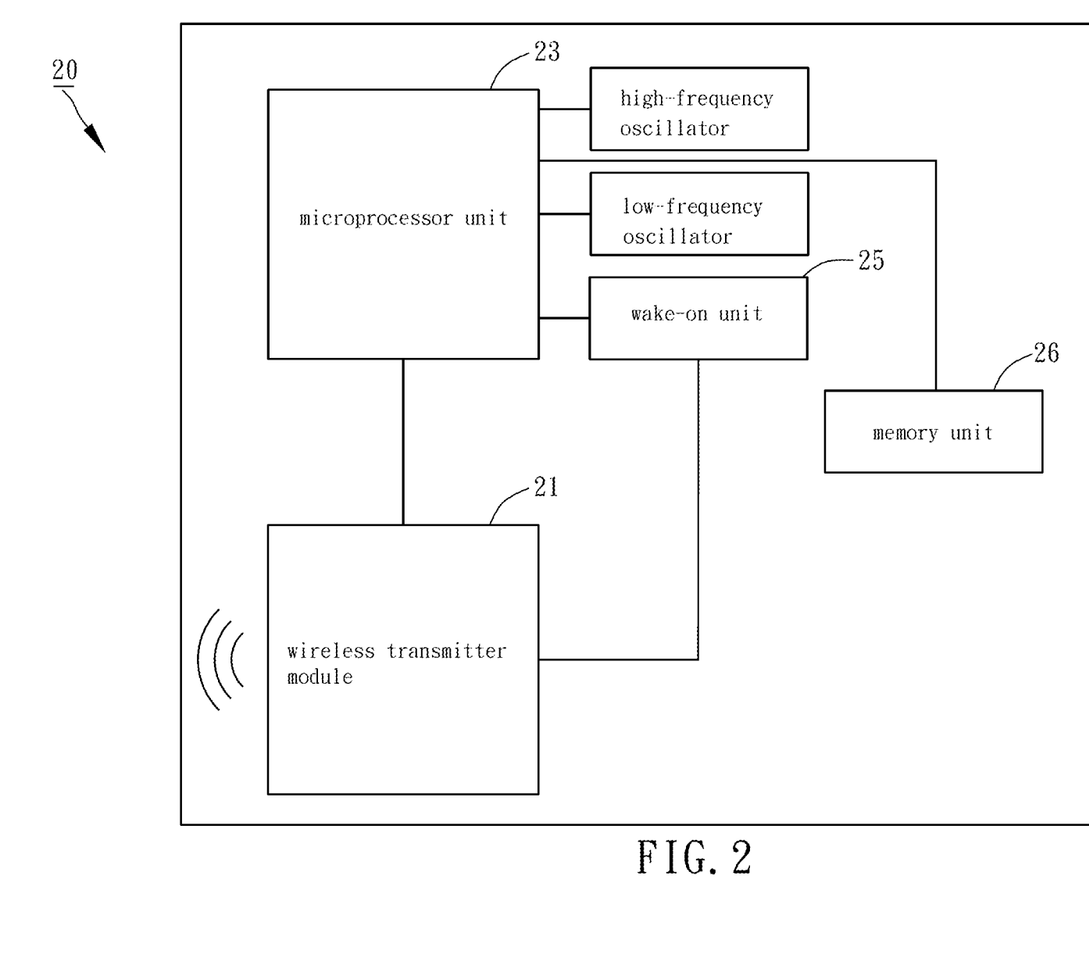
FIG. 2 is a structural diagram of a wireless sensing device according to a first preferred embodiment of the present invention.

FIG. 2 shows a wireless sensing device 20 disclosed in the first preferred embodiment of the present invention. The wireless sensing device 20 is applicable to a monitoring wireless network system (e.g., a home security system, an access control system, a smart campus monitoring system or a parking lot monitoring system) and comprises: a wireless transmitter module 21, a microprocessor unit 23, a wake-on unit 25, a memory unit 26, a high-frequency oscillator, and a low-frequency oscillator.

The wireless transmitter module 21 is electrically connected to the microprocessor unit 23 and the wake-on unit 25, respectively. The microprocessor unit 23 is electrically connected to the wake-on unit 25, the memory unit 26, the high-frequency oscillator, and the low-frequency oscillator, respectively.

It is to be noted that the wireless transmitter module 21 may perform data or signal transmission according to the wireless transmits communication protocol of IEEE 802.15.4. Alternatively, the wireless transmitter module 21 may transmit signals or data using other wireless transmission protocols, such as Wi-Fi, ZigBee, the Bluetooth communication protocol (including but not limited to Bluetooth h2.x+EDR, Bluetooth h3.0+HS, Bluetooth 4.x, Bluetooth Low Energy) and NFC (near field communication). The wake-on unit 25 may be constructed from a real time clock (RTC) module. The memory unit 26 allows the microprocessor unit 23 to store a logic program and sub-programs thereof that operate an on-duty mode, a hibernation mode, or a sleep mode therein. The clock generated by the high-frequency oscillator may act as the duty clock for the microprocessor unit 23 to use in its coming on-duty mode. The clock generated by the low-frequency oscillator may act as the duty clock for the microprocessor unit 23 to use in its coming hibernation mode. The foregoing are non-limiting examples that realize technical features of the present embodiment.

With the main structure of the first preferred embodiment of the present invention in mind, the technical features and benefits of the first preferred embodiment of the present invention will be described in detail below.

First, the wireless sensing device 20 has the functions of wireless communication, transmission and control. This is, when the wireless transmitter module 21 of the wireless sensing device 20 receives a sensing signal from outside (not shown, such as the sensing signal output by the smart electronic device or by the transmitter) and transmits it to the microprocessor unit 23, the microprocessor unit 23 generates a hibernation command if the sensing signal is a high-level signal, or the microprocessor unit 23 generates a sleep command if the sensing signal is a low-level signal. Therein, the microprocessor unit 23 enters the hibernation mode from the on-duty mode it is previously in according to the hibernation command. Alternatively, the microprocessor unit 23 enters the sleep mode from the on-duty mode it is previously in according to the sleep command.

Second, the wireless sensing device 20 has a wake-on-LAN (WOL) function. Particularly, the wireless transmitter module 21 of the wireless sensing device 20 receives a wake-on signal from outside (not shown, such as the wake-on signal output by the smart electronic device or by the transmitter), and further transmits it to the wake-on unit 25. Since the wake-on unit 25 is composed of the real time clock (RTC) module, it generates a duty clock matching operation of the microprocessor unit 23 after a predetermined time period. The duty clock acts as the wake-on source that wakes the microprocessor unit 23 on. Particularly, the wake-on unit 25 generates a resume-from-hibernation duty clock according to the high-level signal of the wake-on signal, and the microprocessor unit 23 generates a resume-from-sleep duty clock according to the low level signal of the wake-on signal. These signals are to be transmitted to the microprocessor unit 23. When the microprocessor unit 23 receives the resume-from-hibernation duty clock and finds it matching, the microprocessor unit 23 returns to the on-duty mode from the hibernation mode according to the resume-from-hibernation duty clock. Alternatively, when the microprocessor unit 23 receives the resume-from-sleep duty clock and finds it matching, the microprocessor unit 23 returns to the on-duty mode from the sleep mode according to the resume-from-sleep duty clock.

Third, the wireless sensing device 20 has an nA-scale power-saving mechanism. When the microprocessor unit 23 enters the hibernation mode or the sleep mode, it keeps the power consumption minimal yet remains the ability to wake up. At this time, since the wake-on unit 25 uses the real time clock (RTC) having both high precision and low power consumption as the wake-on-LAN source, when the wireless transmitter module 21 receives the wake-on signal from outside and transmits it to the wake-on unit 25, the level of the wake-on signal is so low that allows the resent invention to significantly save energy as compared to the prior art where the low-frequency oscillator consumes power of some mA to tens of mA, because the microprocessor unit 23 can be awaken from the hibernation mode or the sleep mode to the on-duty mode with merely some nA (nano ampere). This limits the power consumption of the whole system to merely tens of nA to hundreds of nA.

Fourth, the wireless sensing device 20 has a timed waking up function. Since the wake-on unit 25 is a real time clock (RTC) module, it is possible for a designer to program timing or parameters including a time, a date, and triggering conditions of the real time clock module and set the programmed timing or parameters into the real time clock module as a wake-on source for the microprocessor unit 23 that has entered the hibernation mode or the sleep mode. More particularly, according to the prior art, when it is desired to make a TV set resume its on-duty mode from the hibernation mode or sleep mode (the high-frequency oscillator and the low-frequency oscillator in the TV set need to generate the duty clock continuously with power consumption from some mA to tens of mA), an external remote control has to be used to generate a resume signal for the microprocessor in the TV set to receive and to generate a resume-from-hibernation command or a resume-from-sleep command depending on the strength of the resume signal. Therein, the microprocessor returns to the on-duty mode in response to the resume-from-hibernation command, and uses the duty clock generated by the high-frequency oscillator as the duty clock required by the microprocessor. Alternatively, the microprocessor returns to the on-duty mode in response to the resume-from-sleep, and uses the duty clock generated by the low-frequency oscillator as the duty clock required by the microprocessor. Preferably, since the wake-on unit 25 inherits the properties of high precision and low power consumption of the real time clock (RTC), the overall power consumption of the wireless sensing device 20 during its hibernation mode or sleep mode can be reduced as compared to the wake-on source for the TV set as described previously, and it allows wake-on of the microprocessor unit 23 to be programmable.

Figure 3:
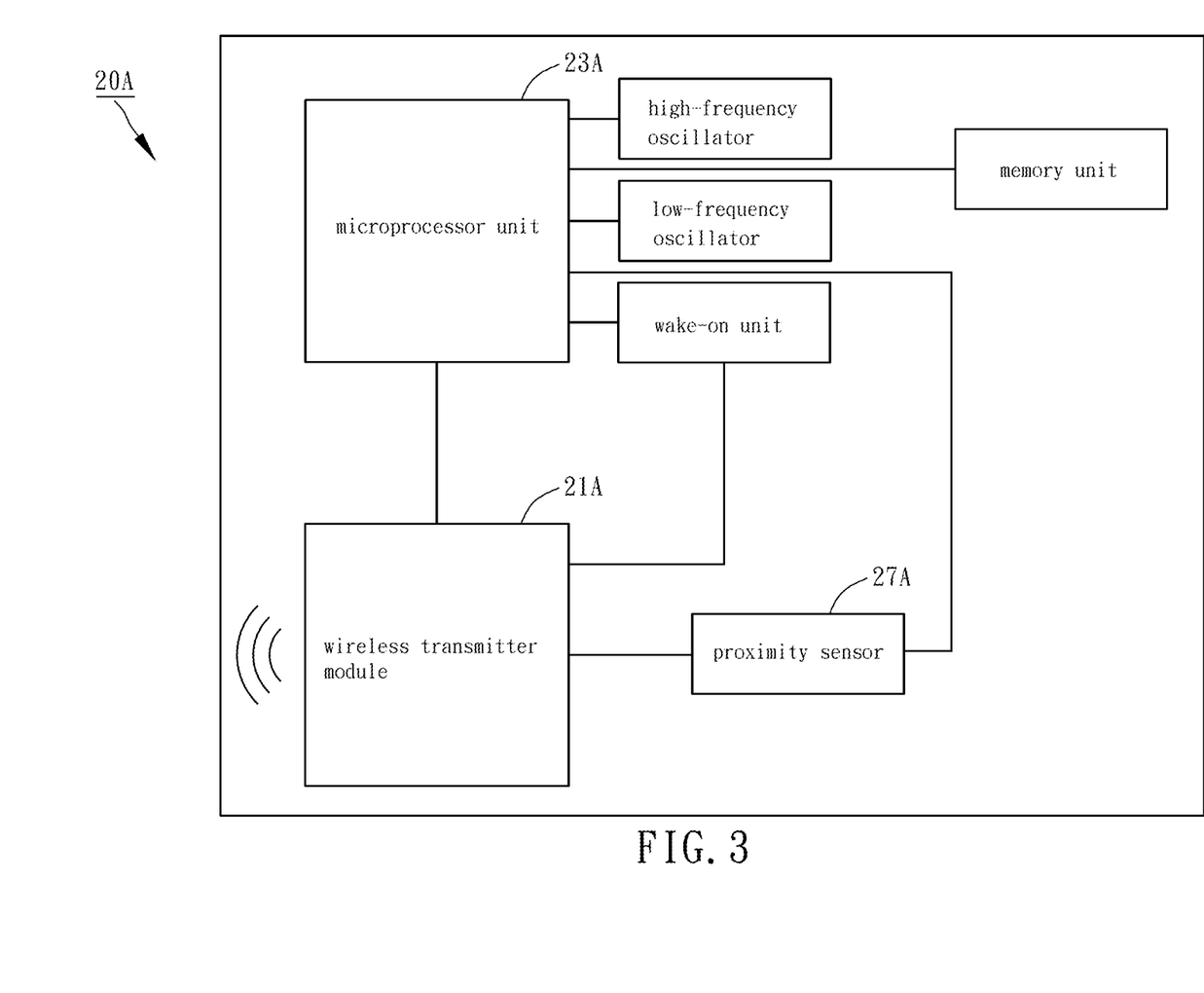
FIG. 3 is a structural diagram of a wireless sensing device according to a second preferred embodiment of the present invention.

Now that the main structure and the technical features of the first preferred embodiment of the present invention have been described, the technical structure and benefits of the second preferred embodiment of the present invention will be described in detail below. FIG. 3 shows a wireless sensing device 20A according to the second preferred embodiment of the present invention. The wireless sensing device 20A is applicable to a monitoring wireless network system (e.g., a home security system, an access control system, a smart campus monitoring system or a parking lot monitoring system), and is structurally similar to its counterpart of the first preferred embodiment, with the difference as described below:

It comprises a proximity sensor 27A electrically connected to the wireless transmitter module 21A and the microprocessor unit 23A, respectively. Preferably, the proximity sensor 27A comprises a reed switch that allows it to generate mobile data in a non-contact manner that are further converted into electric signals of different levels. This is known in the art and detailed description is omitted herein.

Figure 4:
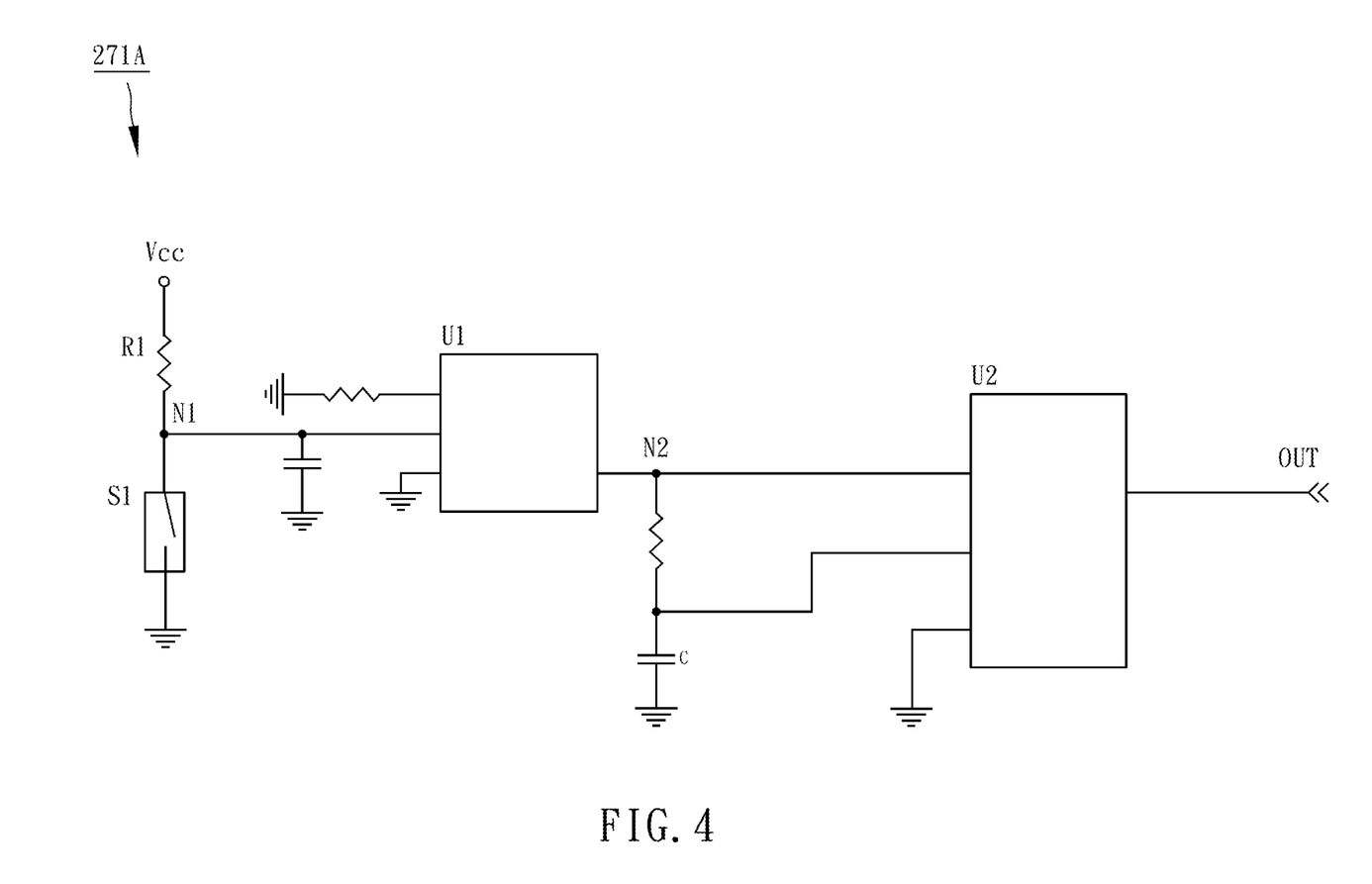
FIG. 4 is a circuit diagram showing part of the wireless sensing device according to the second preferred embodiment of the present invention.

It is to noted that, with reference to FIG. 4 as well, the proximity sensor 27A comprises a trigger switch 271A. The trigger switch 271A comprises a pull-up resistor R1, a proximity switch S1, a buffer chip U1, and a logic chip U2. The pull-up resistor R1 has its one end electrically connected to a power supply Vcc, and has an opposite end electrically connected to the proximity switch S1. The buffer chip U1 is electrically connected to the pull-up resistor R1 and the proximity switch S1 through a node N1. The buffer chip U1 is electrically connected to the logic chip U2 through a node N2. Therein, the microprocessor unit 23A is electrically connected to the output end OUT of the logic chip U2.

With this configuration, the wireless sensing device 20A according to the second embodiment of the present invention has the benefit that the proximity sensor 27A serves to forcedly awake the microprocessor unit 23A. Particularly, when the wireless transmitter module 21A receives a proximity signal from outside (not shown, such as the proximity signal output by the smart electronic device or by the transmitter), and transmits it to the proximity sensor 27A, the proximity sensor 27A generates the resume-from-hibernation signal according to the high-level proximity signal, or the proximity sensor 27A generates the resume-from-sleep signal according to the low-level proximity signal, and transmits it to the microprocessor unit 23A.

Preferably, when the proximity signal triggers the proximity switch S1 of the trigger switch 271A, the proximity switch S1 shifts from an off position to an on position. At this time, as can be measured at the node N1, the input signal transmitted to the buffer chip U1 has turned to low from high. Then the proximity sensor 27A generates the resume-from-hibernation command or the resume-from-sleep command depending on the signal level at the output end OUT of the logic chip U2.

More preferably, when the proximity switch S1 shifts from the on position back to the off position, the change in signal level can be measured at the node N2, and it is possible to further find out whether the proximity switch S1 of the trigger switch 271A no more takes any proximity signal from outside. In the event of emergency (e.g., unauthorized invasion, fire or abnormal gas concentration), the proximity sensor 27A can generate the resume-from-hibernation command or the resume-from-sleep command depending on the signal level so as to make the microprocessor unit 23A return to the on-duty mode from the hibernation mode according to the resume-from-hibernation command or return to the on-duty mode from the sleep mode from the microprocessor unit 23A according to the resume-from-sleep command, thereby facilitating appropriate emergency measures (e.g., an entrance alarm, a fire alarm or a concentration alarm).

Figure 5:
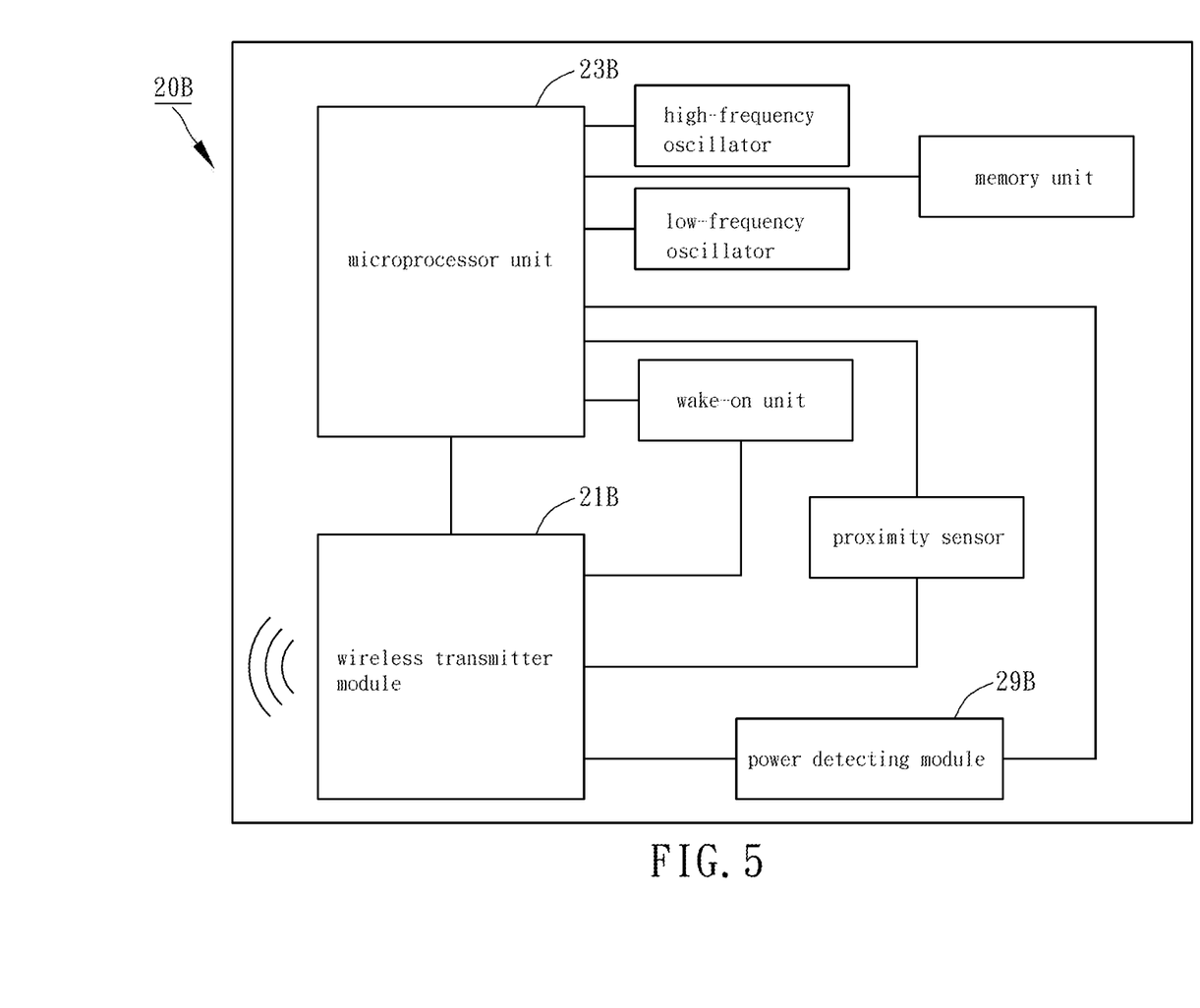
FIG. 5 is a structural diagram of a wireless sensing device according to a third preferred embodiment of the present invention.

Now that the main structure and the technical features of the second preferred embodiment of the present invention have been described, the technical structure and benefits of the third preferred embodiment of the present invention will be described in detail below. FIG. 5 shows a wireless sensing device 20B according to the third preferred embodiment of the present invention. The wireless sensing device 20B is applicable to a monitoring wireless network system (e.g., a home security system, an access control system, a smart campus monitoring system or a parking lot monitoring system) and has its main structure substantively similar to its counterparts in the first and second preferred embodiments, with the difference as described below.

The wireless sensing device 20B comprises a power detecting module 29B that is electrically connected to the wireless transmitter module 21B and the microprocessor unit 23B, respectively. Preferably, the detecting circuit of the power detecting module 29B preliminarily checks the power reserve or power supply of the wireless sensing device 20B is normal or not, and then translates this information into electric signals of different levels.

The wireless sensing device 20B according to the third preferred embodiment of the present invention thus may use the power detecting module 29B to awakes the microprocessor unit 23B of the wireless sensing device 20B as a warning. When the wireless transmitter module 21B receives a detecting signal from outside (not shown, such as a detecting signal output by the smart electronic device or by the transmitter), and transmits it to the power detecting module 29B, the power detecting module 29B generates the resume-from-hibernation command according to the high-level detecting signal, or it generates the resume-from-sleep command according to the low-level detecting signal, and transmits the command to the microprocessor unit 23B.

Where it is found that the power reserve or power supply in the wireless sensing device 20B is used up or is abnormal, the level of the output of the power detecting module 29B can be used to generate the resume-from-hibernation command or the resume-from-sleep command, so as to make the microprocessor unit 23B return to the on-duty mode from the hibernation mode according to the resume-from-hibernation command, or make the microprocessor unit 23B return to the on-duty mode from the sleep mode according to the resume-from-sleep command, thereby facilitating immediate response and emergency measures (e.g., informing an engineer to conduct necessary replacement or repair).

Figure 6:
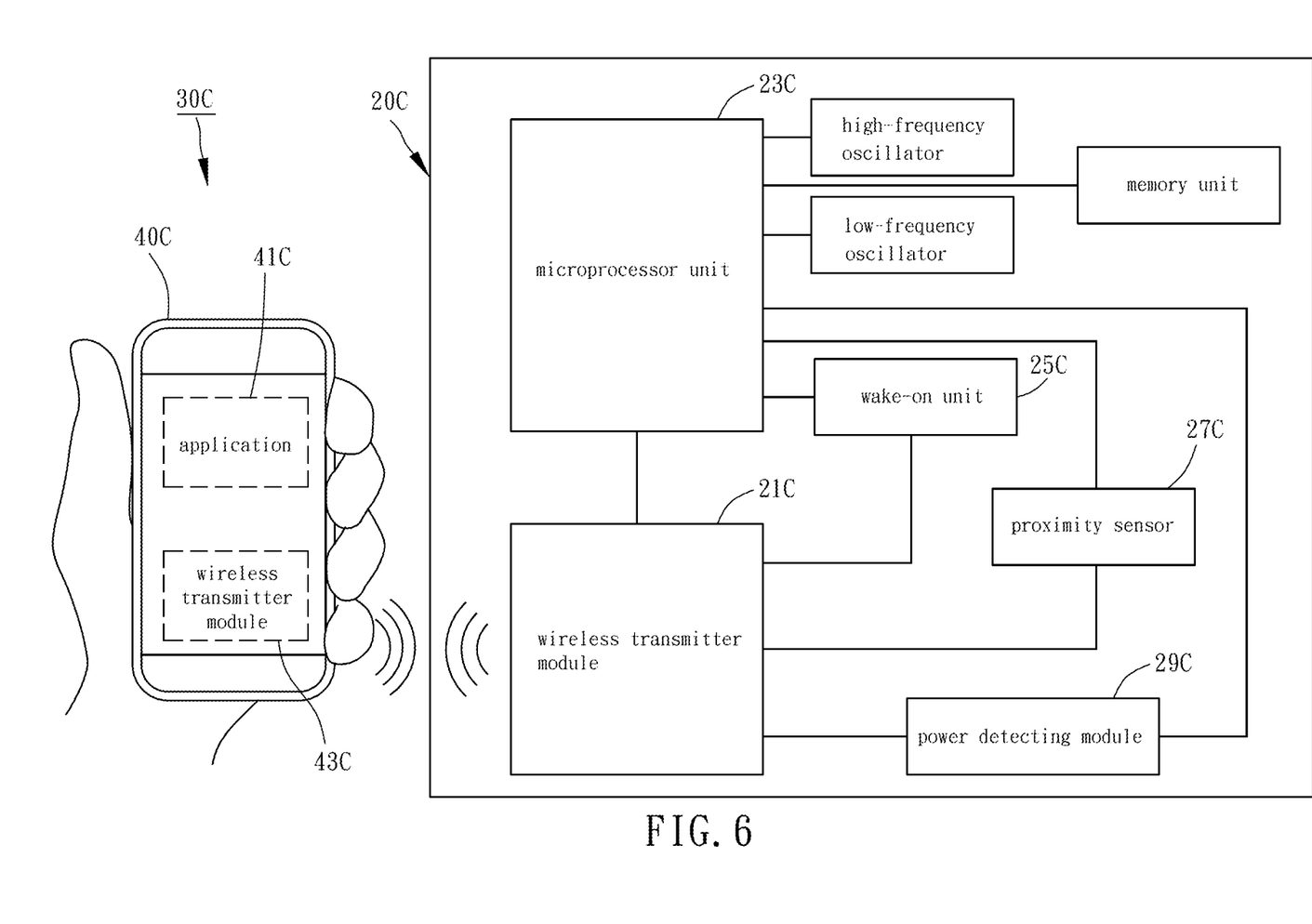
FIG. 6 is a structural diagram of a wireless sensing device according to a fourth preferred embodiment of the present invention.

Now that the main structure and the technical features of the third preferred embodiment of the present invention have been described, the technical structure and benefits of the fourth preferred embodiment of the present invention will be described in detail below. FIG. 6 shows a wireless sensing system 30C according to the fourth preferred embodiment of the present invention. The wireless sensing system 30C is applicable to monitoring uses (e.g., a home security, an access control, a smart campus monitoring or a parking lot monitoring) and comprises a wireless sensing device 20C and a smart electronic device 40C.

The wireless sensing device 20C has its main structure substantively similar to its counterparts described in the first, second and third preferred embodiments.

The smart electronic device 40C comprises an application 41C and a wireless transmitter module 43C. The application 41C is for the smart electronic device 40C to execute. The wireless transmitter module 43C is controlled by the smart electronic device 40C. The wireless transmitter module 43C of the smart electronic device 40C is electrically connected to the wireless transmitter module 21C of the wireless sensing device 20C in a wireless manner.

It is to be noted that, the wireless transmitter module 21C of the wireless sensing device 20C and the wireless transmitter module 43C of the smart electronic device 40C transmit data or signals according to the wireless transmits communication protocol of IEEE 802.15.4. Alternatively, the wireless transmitter module 21C of the wireless sensing device 20C and the wireless transmitter module 43C of the smart electronic device 40C may use wireless transmits communication protocols to transmit data or signals, such as Wi-Fi, ZigBee, the Bluetooth communication protocol (including but not limited to Bluetooth h2.x+EDR, Bluetooth h3.0+HS, Bluetooth 4.x, Bluetooth Low Energy) or NFC (near field communication). However, these are for example only and not intended to limit the technical features of the present embodiment.

To sum up, the technical features of the wireless sensing system 30C of the fourth preferred embodiment of the present invention provide the following benefits:

First, it provides remote monitoring and control. When a user uses the smart electronic device 40C to execute the application 41C and thereby generate the sensing signal, the wireless transmitter module 43C of the smart electronic device 40C transmits the sensing signal to the wireless transmitter module 21C of the wireless sensing device 20C according to the wireless transmits communication protocol of IEEE 802.15.4, and then transmits it to the microprocessor unit 23C. At this time, the microprocessor unit 23C generates the hibernation command according to the high-level sensing signal, or the microprocessor unit 23C generates the sleep command according to the low-level sensing signal. Therein, the microprocessor unit 23 enters the hibernation mode from the on-duty mode it is previously in for responding to the hibernation command. Alternatively, the microprocessor unit 23 enters the sleep mode from the on-duty mode it is previously in for responding to the sleep command. Preferably, the wireless transmitter module 43C of the smart electronic device 40C can receive a signal fed back by the microprocessor unit 23C of the wireless sensing device 20C and can show it through the application 41C.

Second, it has a wake-on-LAN function. When a user uses the smart electronic device 40C to execute the application 41C and thereby generate the wake-on signal, the proximity signal, or the detecting signal, the wireless transmitter module 43C of the smart electronic device 40C transmits the wake-on signal, the proximity signal or the detecting signal to the wireless transmitter module 21C of the wireless sensing device 20C according to the wireless transmits communication protocol of IEEE 802.15.4, and then transmits it to the wake-on unit 25C, the proximity sensor 27C, and the power detecting module 29C. At this time, the wake-on unit 25C, the proximity sensor 27C, and the power detecting module 29C correspondingly generate the resume-from-hibernation command, the resume-from-sleep command, the resume-from-hibernation duty clock or the resume-from-sleep duty clock depending on levels of the wake-on signal, the proximity signal or the detecting signal, and transmit them to the microprocessor unit 23C, thereby making the microprocessor unit 23C return to the on-duty mode from the hibernation mode or the sleep mode resume.

Third, it is able to modulate the wake-on timing. Particularly, the wireless sensing system 30C has a modulating module (i.e. a gateway, not shown), and when there are plural wireless sensing devices 20C, the modulating module modulates the predetermined duty clocks of the sensing signals, the wake-on signals, the proximity signals or the detecting signal of the wireless sensing devices 20C, thereby preventing timing collision between the wireless sensing devices 20C. Preferably, the modulating module may be set in the smart electronic device 40C, or in the microprocessor unit 23C of each of the wireless sensing devices 20C, depending on practical needs.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A wireless sensing device, comprising:
a wireless transmitter module, a microprocessor unit, a wake-on unit, a memory unit, a high-frequency oscillator, and a low-frequency oscillator; the wireless transmitter module being electrically connected to the microprocessor unit and the wake-on unit, respectively, the microprocessor unit being electrically connected to the wake-on unit, the memory unit, the high-frequency oscillator, and the low-frequency oscillator; the wake-on unit being a real time clock (RTC) module; the high-frequency oscillator generating a clock that works as a duty clock for the microprocessor unit when the microprocessor unit is in an on-duty mode; the low-frequency oscillator generating a clock that works as a duty clock for the microprocessor unit when the microprocessor unit is in a hibernation mode; the memory unit allowing the microprocessor unit to store a logic program and sub-programs thereof that operate the on-duty mode, the hibernation mode, or a sleep mode therein;
wherein, when the wireless transmitter module receives a sensing signal from outside, and transmits it to the microprocessor unit, the microprocessor unit generates a hibernation command or a sleep command depending on a level of the sensing signal, so that the microprocessor unit enters the hibernation mode from the on-duty mode it is previously in according to the hibernation command, or the microprocessor unit enters the sleep mode from the on-duty mode it is previously in according to the sleep command;
wherein, when the wireless transmitter module receives a wake-on signal from outside, and transmits it to the wake-on unit, the wake-on unit generates a resume-from-hibernation duty clock and a resume-from-sleep duty clock depending on a level of the wake-on signal, and transmits them to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

2. The wireless sensing device of claim 1, further comprising a proximity sensor that is electrically connected to the wireless transmitter module and the microprocessor unit, respectively, wherein when the wireless transmitter module receives a proximity signal from outside, and transmits it to the proximity sensor, the proximity sensor generates the resume-from-hibernation command and the resume-from-sleep command depending on a level of the proximity signal, and transmits them to the microprocessor unit, respectively, so that the microprocessor unit returns to the on-duty mode from the hibernation mode according to the resume-from-hibernation command, or the microprocessor unit returns to the on-duty mode from the sleep mode according to the resume-from-sleep command.

3. The wireless sensing device of claim 2, wherein the proximity sensor comprises a trigger switch, which comprises a pull-up resistor, a proximity switch, a buffer chip, and a logic chip; the pull-up resistor having its one end electrically connected to a power supply and having its opposite end electrically connected to the proximity switch; the buffer chip being electrically connected to the pull-up resistor and the proximity switch; the buffer chip being electrically connected to the logic chip; in which the microprocessor unit is electrically connected to an output end of the logic chip, so that when the proximity signal triggers the proximity switch of the trigger switch, the proximity switch is switched to a close-circuit position from an open-circuit position, and an input signal transmitted to the buffer chip turns to a low level from a high level, and that the proximity sensor generates the resume-from-hibernation command or the resume-from-sleep command according to a level at an output end of the logic chip, and transmits it to the microprocessor unit.

4. The wireless sensing device of claim 3, further comprising a power detecting module that is electrically connected to the wireless transmitter module and the microprocessor unit, respectively, wherein when the wireless transmitter module receives a detecting signal from outside and transmits it to the power detecting module, the power detecting module generates the resume-from-hibernation command or the resume-from-sleep command depending on a level of the detecting signal and transmits it to the microprocessor unit, so that the microprocessor unit returns to the on-duty mode from the hibernation mode according to the resume-from-hibernation command, or the microprocessor unit returns to the on-duty mode from the sleep mode according to the resume-from-sleep command.

5. The wireless sensing device of claim 2, further comprising a power detecting module that is electrically connected to the wireless transmitter module and the microprocessor unit, respectively, wherein, when the wireless transmitter module receives a detecting signal from outside and transmits it to the power detecting module, the power detecting module generates the resume-from-hibernation command or the resume-from-sleep command depending on a level of the detecting signal, and transmits it to the microprocessor unit, so that the microprocessor unit returns to the on-duty mode from the hibernation mode according to the resume-from-hibernation command, or the microprocessor unit returns to the on-duty mode from the sleep mode according to the resume-from-sleep command.

6. The wireless sensing device of claim 1, further comprising a power detecting module that is electrically connected to the wireless transmitter module and the microprocessor unit, respectively, wherein when the wireless transmitter module receives a detecting signal from outside and transmits it to the power detecting module, the power detecting module generates the resume-from-hibernation command or the resume-from-sleep command depending on a level of the detecting signal, and transmits it to the microprocessor unit, so that the microprocessor unit returns to the on-duty mode from the hibernation mode according to the resume-from-hibernation command, or the microprocessor unit returns to the on-duty mode from the sleep mode according to the resume-from-sleep command.

7. The wireless sensing device of claim 1, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

8. A wireless sensing system, comprising:
the wireless sensing device of claim 7 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;

wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;

wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

9. The wireless sensing system of claim 8, further comprising a modulating module for matching and modulating the duty clock of the wireless sensing device.

10. The wireless sensing device of claim 2, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

11. A wireless sensing system, comprising:
the wireless sensing device of claim 10 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;

wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;

wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

12. The wireless sensing system of claim 11, further comprising a modulating module for matching and modulating the duty clock of the wireless sensing device.

13. The wireless sensing device of claim 3, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

14. A wireless sensing system, comprising:
the wireless sensing device of claim 13 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;

wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;

wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resumefrom-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

15. The wireless sensing device of claim 4, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

16. A wireless sensing system, comprising:
the wireless sensing device of claim 15 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;
wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;
wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

17. The wireless sensing device of claim 5, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

18. A wireless sensing system, comprising:
the wireless sensing device of claim 17 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;
wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;
wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

19. The wireless sensing device of claim 6, wherein it is possible to program timing or parameters including a time, a date, and triggering conditions for awaking the microprocessor unit up and returning it to the on-duty mode from the hibernation mode or the sleep mode resume and set the programmed timing or parameters into the wake-on unit.

20. A wireless sensing system, comprising:
the wireless sensing device of claim 19 and a smart electronic device; the smart electronic device comprising an application and a wireless transmitter module; the application being configured to be executed by the smart electronic device, the wireless transmitter module being controlled by the smart electronic device; the wireless transmitter module of the smart electronic device being electrically connected to the wireless transmitter module of the wireless sensing device in a wireless manner;
wherein, when the smart electronic device executes the application to generate the sensing signal, the wireless transmitter module of the smart electronic device transmits the sensing signal to the wireless transmitter module of the wireless sensing device according to a communication protocol, and further transmits it to the microprocessor unit, so that the microprocessor unit generates a hibernation command or a sleep command depending on a level of the sensing signal and the microprocessor unit enters the hibernation mode from the on-duty mode it is previously in according to the hibernation command while showing this through the application of the smart electronic device; or the microprocessor unit enters the sleep mode from the on-duty mode it is previously in according to the sleep command while showing this through the application of the smart electronic device;

wherein, when the smart electronic device executes the application to generate the wake-on signal, the wireless transmitter module of the smart electronic device transmits the wake-on signal to the wireless transmitter module of the wireless sensing device according to the communication protocol, and further transmits it to the wake-on unit, and the wake-on unit generates the resume-from-hibernation duty clock or the resume-from-sleep duty clock depending on a level of the wake-on signal, and transmits it to the microprocessor unit, so that the microprocessor unit returns to the on-duty mode from the hibernation mode according to the resume-from-hibernation duty clock, or the microprocessor unit returns to the on-duty mode from the sleep mode according to the resume-from-sleep duty clock.

* * * * *